Dec. 16, 1924.  1,519,461
W. B. LIVINGSTON
DEVICE FOR DRAWING OFF LIQUID PORTIONS OF DESIRED DENSITIES
Filed Sept. 8, 1923   2 Sheets-Sheet 1
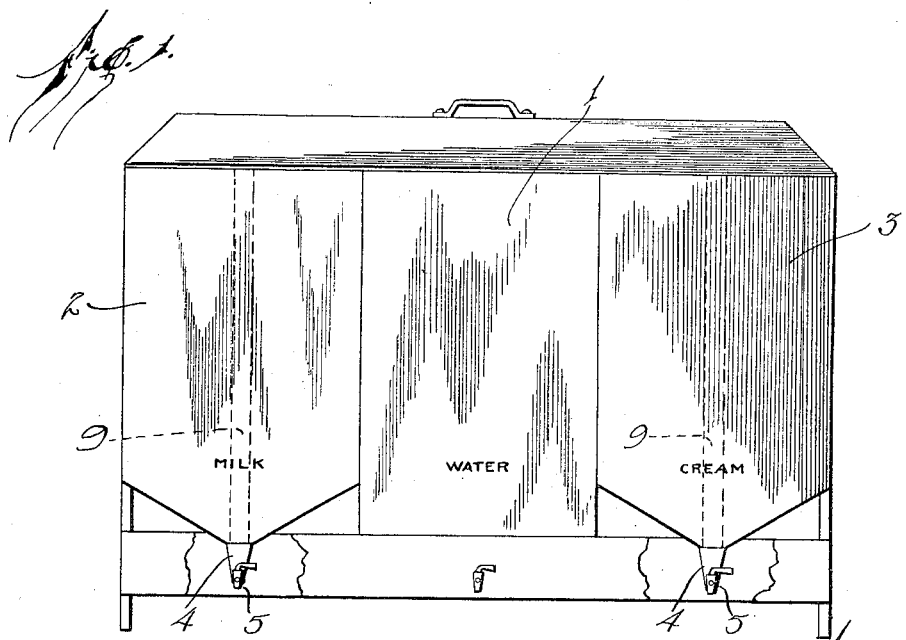
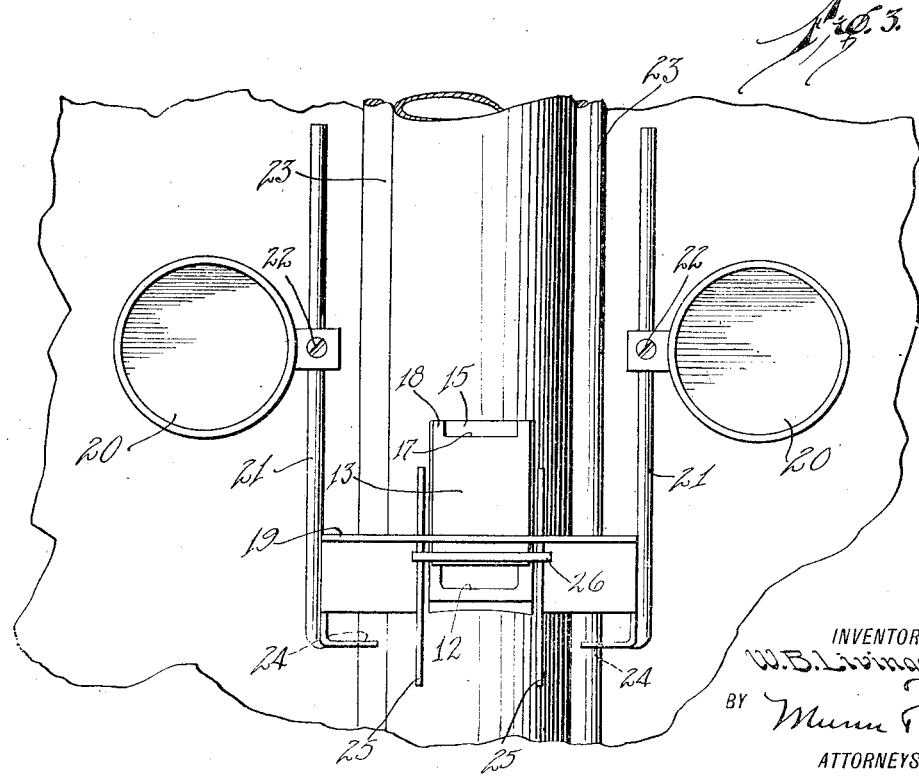
INVENTOR
W. B. Livingston
BY Munn & Co.
ATTORNEYS Dec. 16, 1924.
W. B. LIVINGSTON
1,519,461
DEVICE FOR DRAWING OFF LIQUID PORTIONS OF DESIRED DENSITIES
Filed Sept. 8, 1923
2 Sheets-Sheet 2
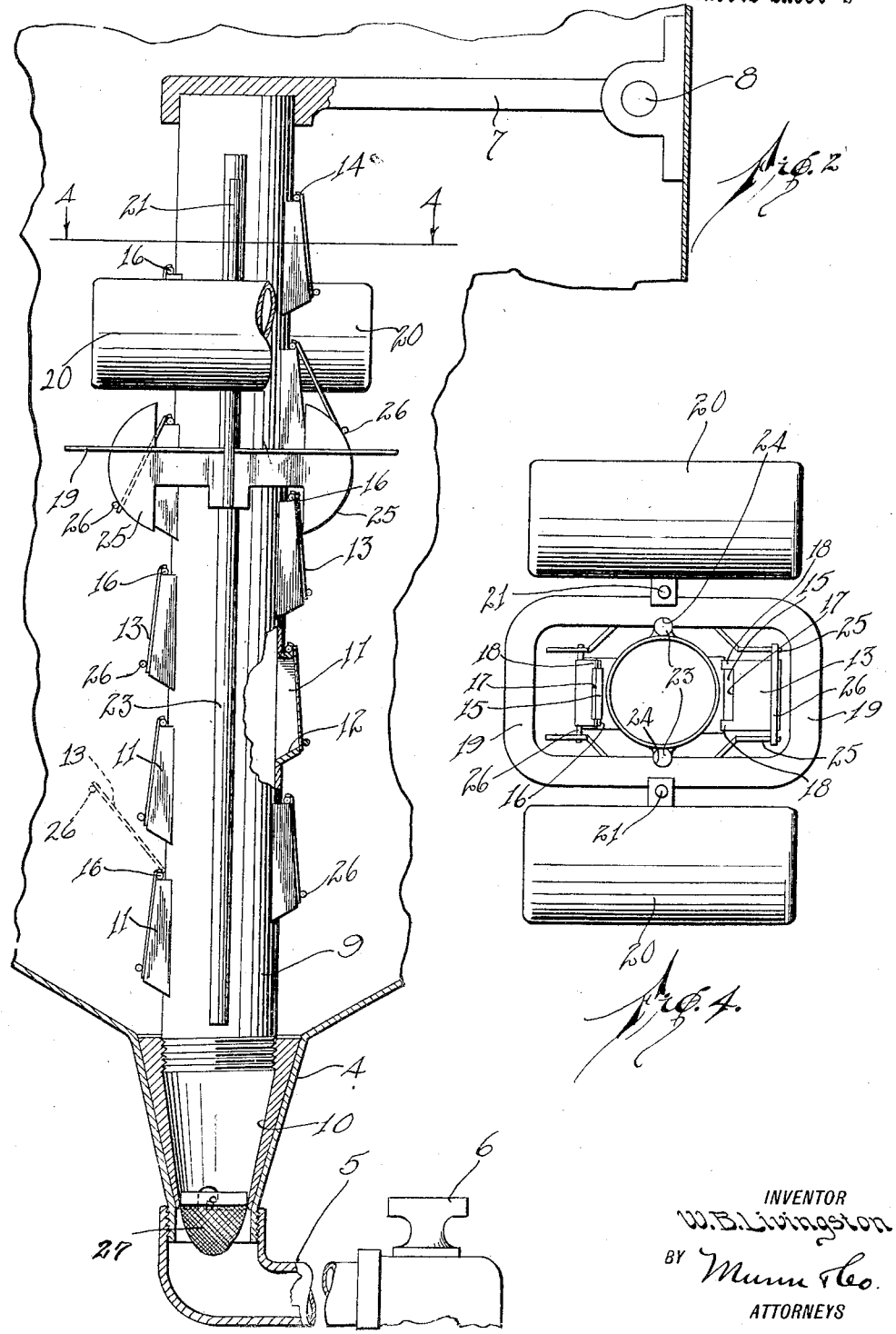
INVENTOR
W. B. Livingston
BY Munn & Co.
ATTORNEYS Patented Dec. 16, 1924.

1,519,461

UNITED STATES PATENT OFFICE.

WILLIAM BENJAMIN LIVINGSTON, OF CHICAGO, ILLINOIS.

DEVICE FOR DRAWING OFF LIQUID PORTIONS OF DESIRED DENSITIES.

Application filed September 8, 1923. Serial No. 661,690.

*To all whom it may concern:*

Be it known that I, WILLIAM BENJAMIN LIVINGSTON, a citizen of the United States, and a resident of Chicago, in the county of Cook and State of Illinois, have invented a new and useful Improvement in Devices for Drawing Off Liquid Portions of Desired Densities, of which the following is a full, clear, and exact description.

My invention relates to improvements in device for drawing off liquid portions of desired densities, and it consists in the combinations, constructions, and arrangements herein described and claimed.

An object of my invention is to provide a device for drawing off liquid portions of desired densities which is adapted to be disposed in any tank containing a liquid, and to draw off portions of this liquid of a predetermined density.

A further object of my invention is to provide a device of the type described which has novel means for drawing off liquid a predetermined distance from the level of the liquid, this distance being kept the same no matter what the level of the liquid in the container is.

A further object of my invention is to provide a device of the type described which is adjustable so as to draw off the liquid at any desired depth.

A further object of my invention is to provide a device of the type described which is simple in construction, durable, and efficient for the purpose intended.

Other objects and advantages will appear in the following specification, and the novel features of the invention will be particularly pointed out in the appended claims.

My invention is illustrated in the accompanying drawings, forming part of this application, in which—

Figure 1 is a front elevation of the dispenser, showing my device operatively applied thereto, Figure 2 is a side elevation of the device, Figure 3 is a side elevation of the device taken at right angles to the view shown in Figure 2, and Figure 4 is a section along the line 4—4 of Figure 2.

In carrying out my invention I make use of a dispenser or any other kind of a container that is adapted to hold liquids varying in density from the level of the liquid to the bottom thereof. In the drawings I have shown the device as being used to dispense milk and cream, but it is obvious that the device could be used to dispense various other kinds of liquids.

The dispenser shown in Figure 1 has a compartment 1 for water, a compartment 2 for milk, and a compartment 3 for cream. The compartments 2 and 3 are provided with conical-shaped portions 4 at their lower ends, (see Figure 2) into which the lower end of the device is adapted to be removably disposed. An outlet pipe 5 is threaded to the conical-shaped portion 4 and is provided with a valve 6 at its outer end. The upper end of the device is held in place by means of an arm 7 that is pivotally secured at 8 to the side of the container.

The device consists of a pipe 9 which is threaded at its lower end to receive a conical-shaped member 10. The member 10 is removably disposed in the conical-shaped portion 4 of the tank or container. The pipe 9 is provided with a number of valves indicated generally at 11. The valves are disposed in two rows, the valves in one row being staggered with respect to the valves in the other. The valves cover openings in the pipe 9.

Swingable covers 13 are hinged to the top walls of the openings as at 14, and are held in closed position by gravity. The side walls of the openings 12 are inclined outwardly so as to permit the covers to firmly seat when they are swung into closed position by gravity.

The hinges 14 are designed so as to permit the covers 13 to be readily removed when desired. In Figure 4 it will be noted that the curved pieces 15 are secured to the top walls of the openings 12, the ends of these curved pieces being spaced from the outer surface of the pipe 9 a distance which is equal to the thickness of the covers 13. When the cover is swung into the dotted line position shown in Figure 2, it may be slid in a direction which is parallel to the longitudinal axis of the curved portion 15. The cover 13 is secured to a pin 16 that is rotatably disposed in the curved portion 15. The cover is provided with a recess 17 which receives the curved portion 15. The portions 18 of the cover that are secured to the pin 16 are adapted to pass between the end of the curved portion 15 and the outer surface of the pipe 9 when the cover is swung into the dotted line position shown in Figure 2. In this manner, the covers 13 may be readily removed when desired.

In Figures 2, 3, and 4, I have shown a novel mechanism for automatically opening the covers 13 so as to permit the liquid in the container to flow into the pipe 9 and out through the pipe 5 and the valve 6. This device consists of a frame 19 which is supported by floats 20. The frame 19 carries guides 21 to which the floats are adjustably secured by means of set screws 22. It will be noted from the drawing that the pipe 9 has guides 23 on its outer surface. The frame 19 has grooves 24 which are adapted to receive the guides 23 whereby the frame is guided in its downward movement.

The frame 19 carries cams 25 which are adapted to engage with pins 26 that are secured to the lower ends of the covers 13. From this construction it will be apparent that a downward movement of the frame 19 will cause the cams 25 to engage with the pins 26 to swing the covers into open position, (see Figure 2). The covers will immediately swing back into closed position due to gravity after the cams have passed thereby.

From the foregoing description of the various parts of the device, the operation thereof may be readily understood. In the ordinary milk or cream dispensers, the cream soon rises to the top, leaving the skimmed milk at the bottom. This milk is the first to be drawn from the device, since the valve is disposed at the bottom of the container. The present device overcomes this disadvantage by drawing the milk at a predetermined point below the top of the liquid. This point is determined in any manner as by testing the density of the milk at different levels, and then by positioning the floats 20 on the guide rods 21 at a position to cause the covers 13 to be opened by the cams 25 to receive the milk at a position below the level of the level which is of this density. The floats 20 float on the top of the liquid and carry the frame 19 and the parts supported thereby.

When the valve 6 is opened, the liquid disposed adjacent to the open covers 13 will flow into the pipe 9, through the pipe 5, and out through the valve 6. As the milk is drained off, the level will lower. The floats will also lower and will cause the cams 25 to move downwardly so as to open the covers 13 that are disposed directly below the covers which have been previously opened. In this manner, the milk is removed from a predetermined point below the level of the liquid, no matter what the level of the liquid is. The valves 11 in the pipe 9 are staggered with respect to each other so as to always have one valve in communication with the liquid. In Figure 3 I have shown the frame 19 as being disposed beneath the floats 20. Some liquids are so light in density that the floats 20 would not ride on the top of the liquid, but would be submerged. In case the liquid was desired to be removed adjacent to the level of the liquid, the device could be inverted from the position shown in Figure 2, so as to dispose the floats below the frame 19.

The device may be readily removed for cleaning. It is merely necessary to swing the arm 7 into a vertical position and then lift the pipe 9 from the conical-shaped portion 4. The containers can be used in the ordinary manner when the device is removed therefrom. In Figure 2 I have shown a strainer 27 removably secured to the lower end of the conical-shaped member 10. The device is simple in construction, and provides a novel means for removing portions of a liquid of any desired density from a liquid that varies in density from the level of the liquid to the lower part of the liquid.

I claim:

1. A device of the type described comprising a pipe having a plurality of openings therein, covers for closing said openings and means slidably disposed on said pipe for opening said covers, said means being adapted to open the covers disposed adjacent thereto, whereby all of the covers will be opened as said means moves downwardly along said pipe.

2. In a device of the type described, a frame, cams carried by said frame, rods carried by said frame, floats adjustably carried by said rods and a pipe having a plurality of valves, said cams being adapted to open said valves.

3. A device of the type described comprising a pipe having a plurality of valves therein, a frame slidably disposed in said pipe, cams carried by said frame for opening said valves, and floats adjustably carried by said frame.

4. In a device of the type described, a pipe, valves carried by said pipe, the openings in said valves overlapping, whereby there will be a valve opening at all points throughout the entire length thereof.

5. A device of the type described comprising a pipe adapted to be removably disposed in a container, valves carried by said pipe, valve opening means slidably disposed on said pipe, and guides carried by said pipe for guiding said valve opening means, said means adapted to be supported by a liquid in the container.

6. A device of the type described comprising a pipe adapted to be removably disposed in a container, valves carried by said pipe, valve opening means slidably disposed on said pipe, and guides carried by said pipe for guiding said valve opening means, said means adapted to be supported by a liquid in the container, said valves being disposed close to each other, whereby one of said valves will always be open during the movement of said valve opening means.

WILLIAM BENJAMIN LIVINGSTON.